Jan. 5, 1937.  F. C. BEST  2,066,552
MOTOR VEHICLE
Filed Dec. 20, 1933  3 Sheets-Sheet 1
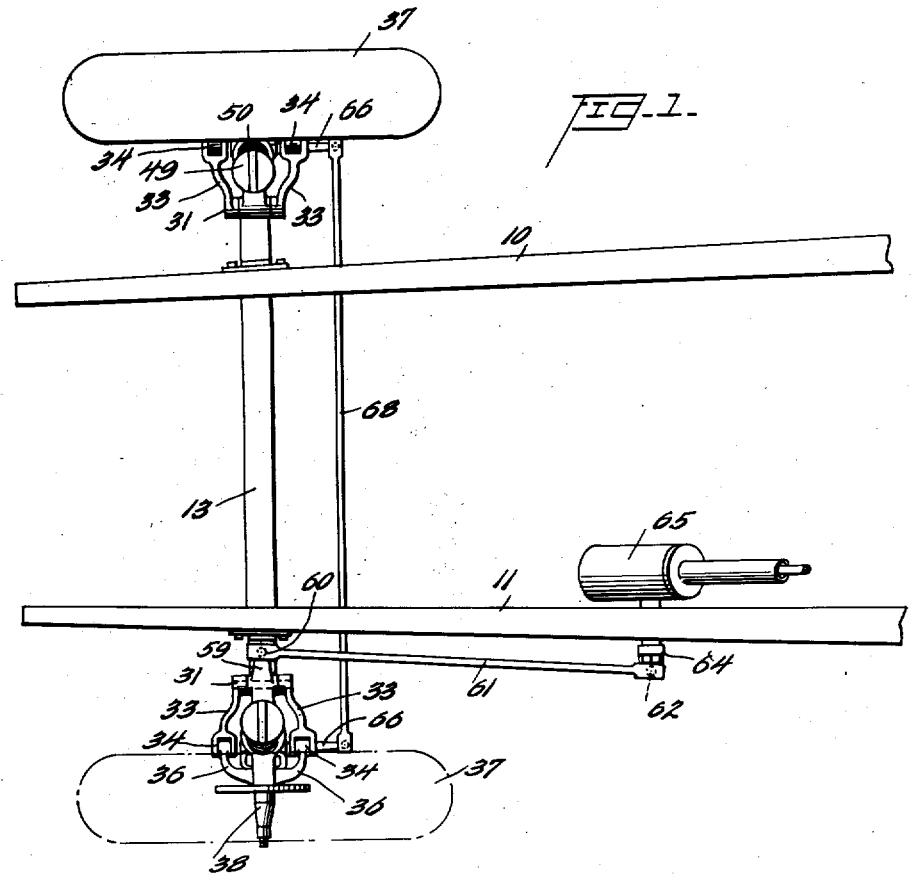
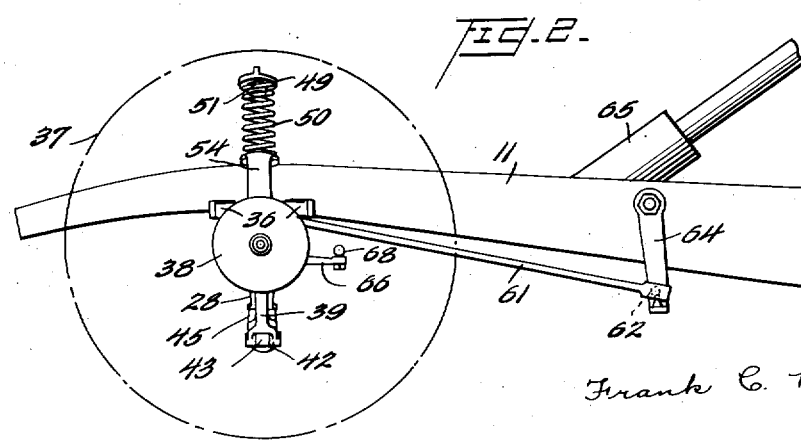
Inventor
Frank C. Best
By Watson, Coit, Morse & Grindle
Attorneys

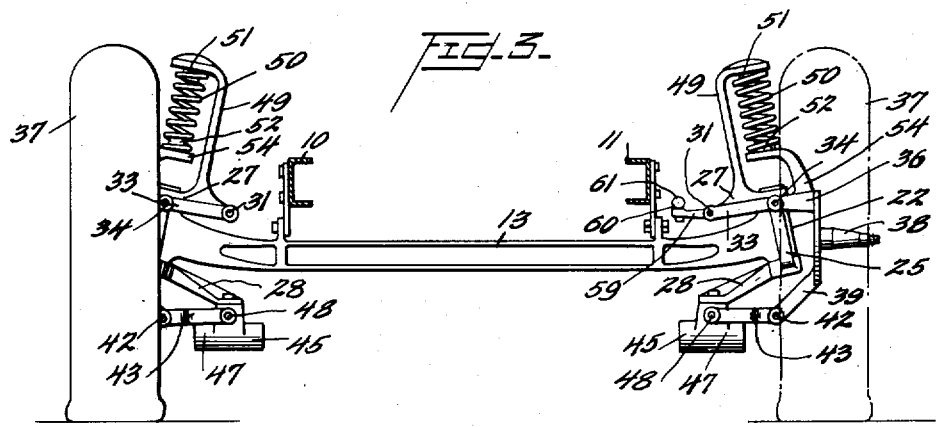
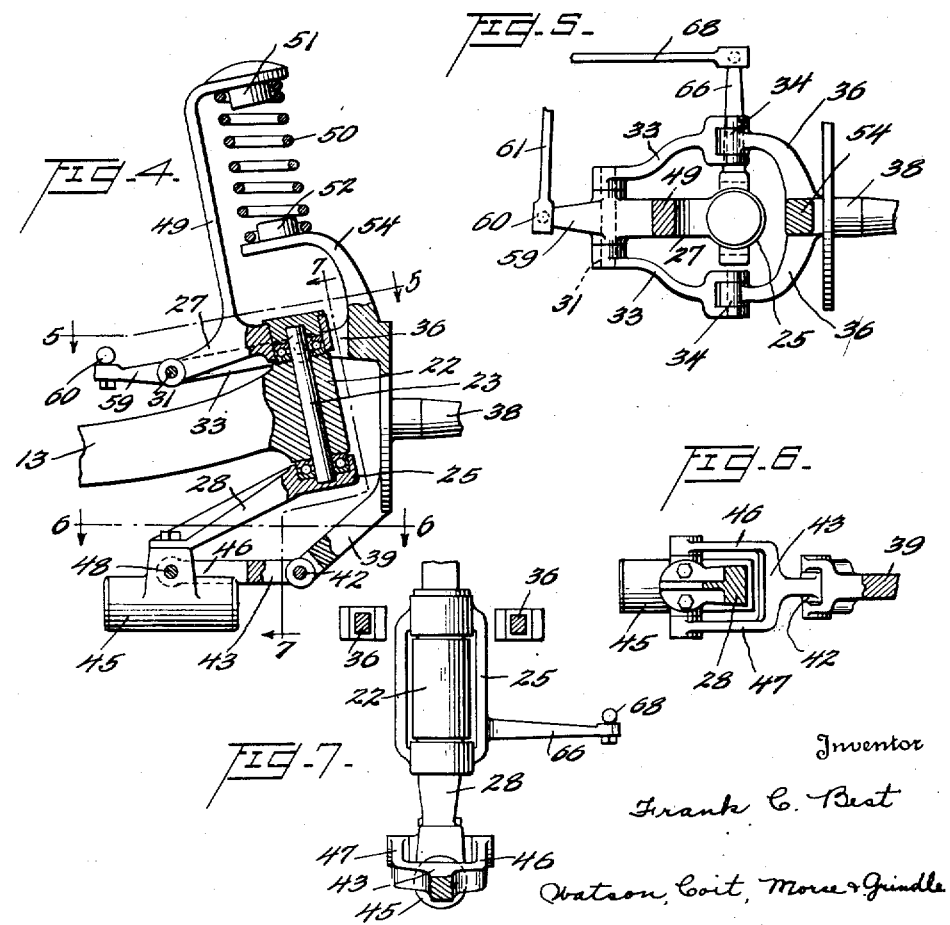

Jan. 5, 1937.　　　　F. C. BEST　　　2,066,552
MOTOR VEHICLE
Filed Dec. 20, 1933　　　3 Sheets-Sheet 3
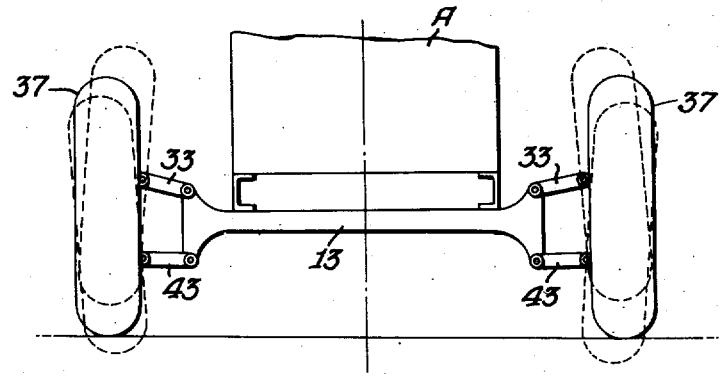
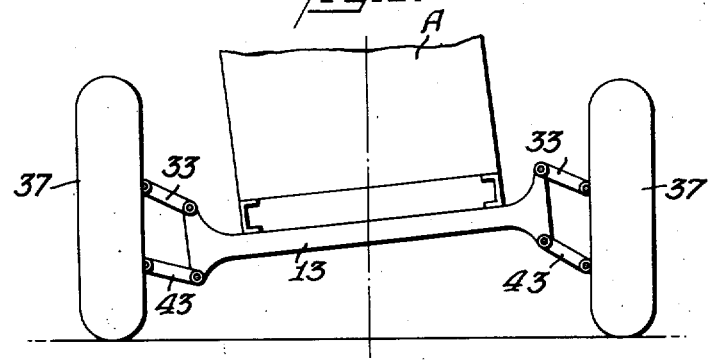
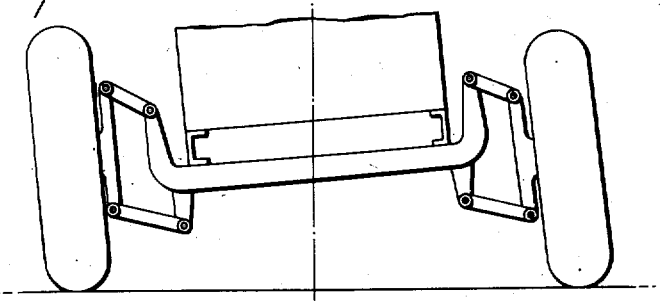
INVENTOR.
Frank C. Best,
BY
Watson, Coit, Morse & Grindle
ATTORNEY.

Patented Jan. 5, 1937

2,066,552

UNITED STATES PATENT OFFICE 2,066,552

MOTOR VEHICLE

Frank C. Best, Detroit, Mich., assignor to Packard Motor Car Company, Detroit, Mich., a corporation of Michigan Application December 20, 1933, Serial No. 703,307

8 Claims. (Cl. 280—124)

This invention relates to motor vehicles and more particularly to wheel suspensions of the type in which oppositely disposed road wheels are supported for independent rising and falling movement with respect to the vehicle frame. It is an object of the invention to provide a wheel suspension which is relatively light but sturdy and which, while not confined to such use, is particularly suitable as applied to the steerable road wheels of the vehicle.

It is a feature of the invention that variation of the wheel tread as the road wheels rise and fall is reduced to a minimum, the construction being preferably such that any variation of the wheel tread which may occur will be of less extent during rising than during falling movement of the wheels, whereby as the vehicle rounds a curve, the outer wheel which carries most of the load will be subjected to least displacement, thereby reducing wear on the tires.

It is a further feature of the invention that as the vehicle rounds a curve at high speed, whereby the body tends to lean outwardly, the camber of the road wheels is not materially altered. In other words, the swaying of the body toward one side or the other does not result in the establishment of a wheel camber which differs to any marked extent from the wheel camber which is assumed when the body is erect.

A further object of the invention in the special application thereof to the steerable road wheels is the provision of a construction in which the steering knuckle or the equivalent thereof is supported on the vehicle frame, yielding means being provided between the knuckle and the road wheel assembly to support the latter for rising and falling movement with respect to the knuckle, whereby the mechanism for imparting steering movement to the road wheels may be carried on the vehicle frame and is thus not displaced as the result of rising and falling movements of the wheels. With such a construction perfect steering may be obtained when any conventional type of steering mechanism is employed.

It is a feature of the invention that rising and falling movement of the road wheels is resisted by coil springs, it being possible to reduce the frequency of coil springs to such an extent as to provide a balanced elastic system at the front and rear of the vehicle which will ensure stability of the body as the vehicle passes over a rough road.

Further objects and features of the invention will be apparent from the following description taken in connection with the accompanying drawings, in which—

Figure 1 is a plan view of a portion of a vehicle chassis illustrating the application of the invention to the front steerable road wheels of the vehicle;

Figure 2 is a side elevation of the arrangement shown in Figure 1;

Figure 3 is a front elevation of Figure 1 with portions of the vehicle frame shown in section;

Figure 4 is a fragmentary view, partly in section, of the wheel mounting shown in Figures 1 to 3 inclusive;

Figures 5, 6 and 7 are sectional views taken respectively on the lines 5—5, 6—6, 7—7 of Figure 4; and Figure 8 is a diagrammatic view illustrating the change in camber of the road wheels in passing over an irregular surface;

Figure 9 is a view similar to Figure 8 and illustrating the mode of operation of the suspension as the vehicle rounds a curve; and Figure 10 is a diagrammatic representation corresponding to Figure 9 but illustrating the position which the road wheels tend to assume in more conventional suspensions of the independent type as the vehicle rounds a curve.

In order to facilitate an understanding of the invention, specific language is employed in describing the various elements shown in the drawing and constituting the preferred form of the invention. It will nevertheless be understood that no limitation of the invention is thereby intended and that various alterations and changes are contemplated such as fall within the scope of the invention. For instance, while the invention has been illustrated as applied to the steerable road wheels of a vehicle, it will be apparent from the following description that certain features of the invention are equally applicable to road wheels which are not steerable.

The invention is shown as applied to a conventional motor vehicle frame comprising the side frame members 10 and 11. A transversely extending axle 13 secured rigidly to the side frame members 10 and 11 is preferably employed although it will be obvious from the following description that the axle may be replaced by separate wheel supporting members secured to the respective side frame members at opposite sides of the vehicle. The axle 13 is formed at each end to provide a boss 22 receiving a king pin 23, and a steering knuckle 25 is associated with each end of the axle and is supported for steering movement thereon about the axis of the king pin 23 as illustrated in the drawing or in any conventional manner. Since the construction is identical at the two sides of the vehicle, reference will be made to the elements at one side thereof only in order to simplify the description.

Thus each steering knuckle 25 may be of substantially yoke shaped form, as shown more particularly in Figure 7 of the drawing, and is provided with upper and lower arms indicated at 27 and 28 respectively, these arms being rigid with the body of the knuckle and preferably formed integrally therewith. It will be appreciated that the fundamental purpose of the construction thus far described is the mounting of a steering member or knuckle on a vehicle frame for swinging steering movement with respect thereto and that the details of the mounting are not essential, various modifications of these details being at once apparent to one skilled in the art to which the invention relates.

The arm 27 affords a pivotal support about an axis 31 for a pair of upper wheel supporting links 33, the latter being in turn pivotally connected as indicated at 34 with arms 36 which are in turn formed integrally with or secured rigidly to the wheel spindle 38 on which the road wheel 37 is carried. A depending arm 39, likewise rigid with the wheel spindle 38, is pivotally connected on an axis 42 with a lower wheel supporting link 43. The link 43 is forked to provide arms 46 and 47 as shown more particularly in Figures 4 and 6 of the drawings, these arms embracing a shock absorber housing 45, the latter being carried by and rigidly secured to the knuckle arm 28. The arms 46 and 47 of the link 43 are secured rigidly to the respective ends of a shaft 48 which extends through and is supported for rocking movement in the upper portion of the shock absorber housing 45 and which is operatively connected to mechanism within the housing. This shock absorbing mechanism is preferably of the well-known hydraulic type, it being understood that as the shaft 48 is rocked, movement of fluid within the housing 45 through more or less restricted passages is effected and movement of the shaft 48 accordingly resisted.

The steering knuckle arm 27 carries an upstanding arm 49, illustrated as formed integrally with the arm 27, and provided adjacent the upper end thereof with a suitable spring seat receiving a coil spring 50, a spring guide 51 being associated with the seat and extending within the coil spring to retain the latter in position. A similar spring guide 52 is associated with an opposed spring seat on an upwardly directed arm 54, the latter being secured to or integral with the wheel spindle 38. If desired the guides 51 and 52 may be lengthened to approach more closely and may be formed of yielding material such as rubber so as to serve as abutments to limit upward movement of the wheel assembly.

The mode of operation of the wheel suspension will be readily understood from the foregoing description. As either road wheel 37 rises and falls in passing over a surface of irregular contour, the links 33 and 43 will swing upwardly and downwardly about the pivotal axis 31 and the axis of the shaft 48 respectively, the coil spring 50 yieldingly resisting this movement and the shock absorbing mechanism within the housing 45 acting to damp the movement in the conventional manner.

It will be observed that the axis of the coil spring is located in substantial alignment with the axis of steering movement of the knuckle 25. This construction effects a reduction in the stresses carried through the several elements of the wheel suspension to the frame and is also important in eliminating the application of unnecessary strain to the knuckle bearings, it being observed that there are no forces acting to cant these bearings such as would be present if the coil spring were otherwise disposed with reference to the steering knuckle. Incidentally, the knuckle axis is preferably disposed in the conventional manner so as to intersect the wheel tread at the ground, and thus the load is carried on this axis directly to the coil spring.

When vehicle brakes are applied, the wheel suspension system of either wheel is subjected to a counterclockwise torsional stress as viewed from the side of the vehicle. With the present construction this stress is resisted largely by the lower wheel supporting link 43, it being observed that this link is connected to the steering knuckle and thereby to the vehicle frame at points on the axis of pivotal movement thereof which are spaced to a sufficient extent to adequately resist the applied stress.

In the drawings illustrating the preferred form of the invention the several elements have been shown in the positions which they occupy when the road wheel 37 occupies the normal or mid-position thereof, the road wheel being capable of executing either rising or falling movements from this position. It will be noted that the link 43 extends horizontally from the shaft 48 which affords the pivotal axis therefor and that the link 33 extends upwardly from the axis 31, the links being of substantially equal length. If the links 33 and 43 were parallel and disposed in horizontal planes in the normal position of the wheel, it is obvious that the wheel would be displaced bodily inwardly during rising movement thereof from a normal position with consequent displacement of the tread resulting in severe wear on the tires. However, since the link 43 during rising movement of the wheel lies in or at least near a generally horizontal position, whereas the upper link 33 is inclined to a considerable extent with the horizontal and moves further from a horizontal position as the wheel rises, the upper portion of the wheel will be moved inwardly toward the frame to a greater extent than the lower portion and as the result of this tilting of the plane of the wheel, the tread will rise substantially vertically. Furthermore, the tread displacement will be much less during rising than during falling movement as will be apparent from the drawing, and consequently as the vehicle rounds a curve that wheel which carries the major portion of the load will be subjected to the least lateral displacement so that wear on the tread is minimized.

It may be mentioned that the angular displacement or tilting of the plane of the wheel as the wheel rises and falls is an important factor in obtaining positive and easy steering control of the vehicle. Thus, as pointed out more particularly in my co-pending application covering improvements in Motor vehicles, Serial No. 703,309, filed December 20, 1933, there are certain advantages and certain disadvantages inherent in a construction in which the road wheel is always maintained during rising and falling movement in approximate parallelism with the vehicle. Similarly there are certain advantages and disadvantages in the employment of a construction in which the wheel as it rises and falls always remains perpendicular to a line extending transversely of the vehicle and passing through the point of contact of the wheel tread with the ground and through the intersection of the central vertical plane of the vehicle body with the ground, the last named construction representing the opposite extreme in the matter of angular displacement of the plane of the road wheel.

It is therefore the purpose of the present invention to effect a compromise between these two widely differing constructions and it will be observed that with the wheel suspension illustrated in the drawings a change in camber occurs as the wheels rise and fall, so that the present construction is characterized neither by a parallel relationship of the wheel to the frame nor by an extreme change in camber of the wheel. In this manner wear of the tire tread is maintained within practical limits while fairly easy steering control is retained.

The effect of this type of wheel suspension on the wheel camber is shown more particularly in Figures 8 and 9. To facilitate illustration of the function of the suspension the camber change is exaggerated somewhat in these figures, and it will of course be understood that the precise effect obtained can be varied to a considerable extent by modifying the several factors involved such as the length of the links and their relative inclination. Thus in Figure 8 the body is represented at A and the road wheels 37 are represented in full lines in the position which they normally occupy on a level road bed, the conventional slight wheel camber being disregarded, the wheels occupying a vertical position. The road wheels are also shown in dotted lines in the upper position to which they would be displaced in passing over an elevation and in the lower position to which they would be displaced in moving over a depression in the road bed. It will be seen that in the upper position the upper portion of the wheel leans inwardly, and as the wheel moves down the upper portion of the wheel is displaced outwardly of the body. In other words, the change in camber from the upper position through the normal position and to the lower position is in the same direction. The difference in function over prior and more conventional constructions which rely solely or principally on the use of a shorter upper link will be apparent from a comparison of Figure 8 with Figures 1 and 2 of the patent to Ascarelli No. 1,694,305, granted December 4, 1928. It will be observed that in the prior patent during downward displacement of the road wheel from its upper position to its normal position, the upper portion of the wheel is displaced outwardly. During continued downward displacement from the normal position to the lower position, the upper portion of the wheel is displaced inwardly, so that in contrast to the continued change in camber in one direction as the wheel moves downwardly, resulting from the employment of the invention disclosed herein, the Ascarelli structure results in a change in camber first in one direction and then in the other during continued downward displacement of the wheel. In accordance with the present invention the change in wheel camber is determined principally by the relation of the angular disposition of the links to the horizontal, whereas in the Ascarelli structure the change in camber is controlled solely by the difference in the link lengths.

This is a most important distinction when the action of the suspension as the vehicle rounds a curve is observed. Thus Figure 9 may be considered as representing a rear elevation of the vehicle, the vehicle moving away from the observer and being steered to the right, the body A accordingly leaning outwardly of the curve or toward the left. On the occurrence of such body sway, the right wheel assumes a position with respect to the body corresponding to the lower position of Figure 8 while the left wheel assumes a position with respect to the body corresponding to the upper position of Figure 8. As a result, both wheels occupy with respect to the road bed a substantially vertical position. Reference may now be made to Figure 10 which is a view similar to Figure 9 but which represents the position assumed by the wheels on rounding a curve where the suspension is of the type shown in the Ascarelli patent in which reliance is placed principally on the difference in the length of the upper and lower links, these links normally assuming a substantially horizontal position. It will be seen from this figure that the upper portion of the right wheel will be swung inwardly, and the upper portion of the left wheel will be swung outwardly with respect to the body. In other words, the wheels tend to assume a position of parallelism with the body, both wheels leaning toward the left. When a road wheel leans toward the left, it tends to roll toward the left, acting in much the same manner as though it represented the periphery of the base of a cone of which an element of the cone rests on the road bed. Since the vehicle is being steered toward the right, and the wheels tend to roll toward the left, excessive steering recovery is established and it becomes difficult to hold the car on the turn at high speed. While some steering recovery is desirable, and it can readily be established by proper design of a suspension constructed in accordance with the principles of the present invention, it is commonly recognized that one of the difficulties in steering arises from the establishment of excessive steering recovery. In other words, Figures 8 and 9 are purely diagrammatic and it is by no means intended that the road wheels shall assume a precisely vertical position when the vehicle constructed in accordance with the principles of the present invention rounds a curve; the controlling factors may be readily varied so as to give the wheels a slight tendency to move with the body to apply a slight and desirable amount of steering recovery.

Since the steering knuckle 25 and the associated parts including the arm 27 partake of no rising and falling movement whatever as the vehicle is operated, perfect steering may be obtained by the use of the simple steering mechanism illustrated in the drawings. Thus this mechanism may comprise a steering drag link 61 having an articulated connection with an inwardly directed portion 59 of the arm 27 as indicated at 60, the drag link being likewise pivotally connected as at 62 to a steering drop arm 64 operable from gearing within the usual steering housing 65. Arms 66 extending rearwardly from and preferably formed integrally with each steering knuckle 25 are connected by means of a cross tie rod 68 having an articulated connection with each arm 66 to ensure conjoint steering movement of the two road wheels in the conventional manner. Since the entire steering mechanism is carried on the frame there is no tendency to impart undesired steering movement to the road wheels as the latter rise and fall, and accordingly any tendency of the road wheels to shimmy is reduced.

Stability of the steering mechanism and resistance to shimmy are further assured by reason of the fact that the shock absorbing mechanism is supported by and swings with the road wheel assembly during steering movement, this shock absorbing mechanism providing a mass located at a substantial distance from the steering axis and thus providing a considerable inertia effect opposing accelerative steering movement of the road wheel assembly and associated parts. This disposition of the shock absorbing mechanism further simplifies the construction by eliminating the usual linkage affording an operative connection between the shock absorber and the wheel suspension.

As hereinbefore indicated the coil springs which are employed to support the vehicle may be so constructed that the frequency of the elastic system including the springs and the load carried thereby is relatively low. Much lower frequencies may be obtained with coil springs than is possible with leaf springs since the extent to which the frequency of leaf springs can be reduced, without sacrificing adequate strength to support the load, is limited. Thus by the present construction the frequency of the elastic system may be maintained within such limits that riding comfort is materially increased, less rapid rising and falling movement of the vehicle body being unobjectionable. Furthermore, it is possible by the use of coil springs to establish a frequency for the elastic system at the front end of the vehicle which is at least as low as the frequency of the elastic system at the rear end of the vehicle and thus the vehicle body may be supported in positions substantially parallel with the general plane of the road bed regardless of the nature of the road surface, fore and aft rocking of the vehicle frame and body about transverse axes being substantially eliminated.

It will be understood that while the axes of pivotal connection of the links to the axle and to the wheel assembly are necessarily parallel, they need not be disposed with reference to the vehicle frame as illustrated in the drawings. Thus these axes may be inclined either forwardly or rearwardly with respect to the vertical plane containing the longitudinal axis of the vehicle and may also be inclined with respect to a horizontal plane. Furthermore, the length of the links and their angular disposition with respect to each other in the normal position of the wheel may be modified to produce any desired movement of the wheel as the latter rises and falls. Again, the links may assume a parallel relationship to afford the conventional and simple parallelogram wheel supporting structure. Thus no limitation of the disposition of these links is intended except where such is specifically mentioned in the claims.

Obviously in the application of the wheel suspension system disclosed herein to road wheels which are not steerable, the steering knuckle and associated parts as represented in the accompanying drawings will be eliminated. In other words, the steering knuckle which in the construction shown forms in effect a part of the vehicle frame insofar as rising and falling movement of the wheel is concerned, will be rigidly secured to or formed integrally with the frame when associated with a non-steerable wheel.

Having thus described the invention, what is claimed as new and desired to be secured by Letters Patent is:

1. In a motor vehicle, the combination with a vehicle frame, of a steering knuckle carried by said frame, a steerable road wheel assembly, a pair of vertically spaced links pivoted to said knuckle and to said road wheel assembly to support the latter for rising and falling movement with respect to the frame, and a shock absorber carried by said knuckle, said shock absorber having an operating shaft affording a fulcrum for one of said links.

2. In a motor vehicle, the combination with a vehicle frame, of a steering knuckle carried by said frame, a steerable road wheel assembly, a pair of vertically spaced links pivoted to said knuckle and to said road wheel assembly to support the latter for rising and falling movement with respect to the frame, and a shock absorber carried by said knuckle, said shock absorber including an actuating rockable shaft therefor, said shaft being rigidly connected to and operable by one of said links and affording the pivotal connection between the knuckle and the link.

3. In a motor vehicle, the combination with a vehicle frame, of a steering knuckle carried by said frame, a steerable road wheel assembly, and a pair of vertically spaced links pivoted to said knuckle and to said road wheel assembly to support the latter for rising and falling movement with respect to the frame, said links extending laterally of said frame whereby the wheel plane is displaced as the wheel rises and falls, one of said links being connected with said knuckle and with said wheel assembly at spaced points in the pivotal axes thereof to resist torsional stresses.

4. In a motor vehicle, the combination with a vehicle frame, of a steering knuckle carried by said frame, a steerable road wheel assembly, a pair of vertically spaced links pivoted to said knuckle and to said road wheel assembly to support the latter for rising and falling movement with respect to the frame, and yielding means operatively and directly interposed between said knuckle and said wheel assembly to yieldingly resist upward movement of the latter, said yielding means comprising a coil spring having the axis thereof substantially aligned with the knuckle axis.

5. In a motor vehicle, the combination with a vehicle frame, of an axle substantially rigid with said frame, a steering knuckle carried by said axle, inwardly directed arms on said knuckle, a steerable road wheel assembly, a pair of links, each of said links being pivoted to one of said arms and to said wheel assembly to support the latter for rising and falling movement with respect to the frame, and a shock absorber carried by one of said arms at a substantial distance from the axis of said knuckle, said shock absorber being operatively associated with said wheel assembly to damp movement of the latter.

6. In a motor vehicle, the combination with a vehicle frame, of a road wheel assembly, means supporting said road wheel assembly on said frame for rising and falling movement with respect thereto, said means comprising a pair of vertically spaced laterally extending links pivotally connected to said frame and said wheel assembly, neither of said links being substantially greater in length than the other, the upper of said links being slightly inclined upwardly and the lower of said links extending generally horizontally from the points of pivotal connection thereof with the frame in the normal position of the wheel, the relative inclination of said links being such that the upper portion of the wheel moves inwardly and the wheel is tilted as it rises, whereby tread variation is minimized by relative inward displacement of the upper portion of the wheel.

7. In a motor vehicle, the combination with a vehicle frame, of a road wheel assembly, means supporting said road wheel assembly on said frame for rising and falling movement with respect thereto, said means comprising a pair of vertically spaced laterally extending links pivotally connected to said frame and said wheel assembly, neither of said links being greater in length than the other, the upper of said links being slightly inclined upwardly and the lower of said links extending generally horizontally from the points of pivotal connection thereof with the frame in the normal position of the wheel, the disposition of the pivotal axes of the links being such that as the wheel either rises or falls from a normal position, the angular relation of the plane of the wheel with respect to the frame and with respect to a line connecting the wheel tread and the intersection of the central vertical plane of the frame and the road will be altered.

8. In a motor vehicle, the combination with a vehicle frame, of a road wheel assembly, means supporting said road wheel assembly on said frame for rising and falling movement with respect thereto, said means comprising a pair of vertically spaced laterally extending links pivotally connected to said frame and said wheel assembly, neither of said links being substantially greater in length than the other, the upper of said links being slightly inclined upwardly and the lower of said links forming an acute angle with the upper link, said links diverging outwardly of said frame, in the normal position of the wheel, the relative inclination of said links being such that the wheel is tilted inwardly as it rises, whereby tread variation is minimized.

FRANK C. BEST.

CERTIFICATE OF CORRECTION.

Patent No. 2,066,552.     January 5, 1937.

FRANK C. BEST.

It is hereby certified that error appears in the printed specification of the above numbered patent requiring correction as follows: Page 5, first column, line 14, claim 7, before the word "greater" insert substantially; and that the said Letters Patent should be read with this correction therein that the same may conform to the record of the case in the Patent Office.

Signed and sealed this 25th day of May, A. D. 1937.

(Seal)     Henry Van Arsdale
Acting Commissioner of Patents.

the wheel, the relative inclination of said links being such that the upper portion of the wheel moves inwardly and the wheel is tilted as it rises, whereby tread variation is minimized by relative inward displacement of the upper portion of the wheel.

7. In a motor vehicle, the combination with a vehicle frame, of a road wheel assembly, means supporting said road wheel assembly on said frame for rising and falling movement with respect thereto, said means comprising a pair of vertically spaced laterally extending links pivotally connected to said frame and said wheel assembly, neither of said links being greater in length than the other, the upper of said links being slightly inclined upwardly and the lower of said links extending generally horizontally from the points of pivotal connection thereof with the frame in the normal position of the wheel, the disposition of the pivotal axes of the links being such that as the wheel either rises or falls from a normal position, the angular relation of the plane of the wheel with respect to the frame and with respect to a line connecting the wheel tread and the intersection of the central vertical plane of the frame and the road will be altered.

8. In a motor vehicle, the combination with a vehicle frame, of a road wheel assembly, means supporting said road wheel assembly on said frame for rising and falling movement with respect thereto, said means comprising a pair of vertically spaced laterally extending links pivotally connected to said frame and said wheel assembly, neither of said links being substantially greater in length than the other, the upper of said links being slightly inclined upwardly and the lower of said links forming an acute angle with the upper link, said links diverging outwardly of said frame, in the normal position of the wheel, the relative inclination of said links being such that the wheel is tilted inwardly as it rises, whereby tread variation is minimized.

FRANK C. BEST.

CERTIFICATE OF CORRECTION.

Patent No. 2,066,552.  January 5, 1937.

FRANK C. BEST.

It is hereby certified that error appears in the printed specification of the above numbered patent requiring correction as follows: Page 5, first column, line 14, claim 7, before the word "greater" insert substantially; and that the said Letters Patent should be read with this correction therein that the same may conform to the record of the case in the Patent Office.

Signed and sealed this 25th day of May, A. D. 1937.

(Seal)

Henry Van Arsdale
Acting Commissioner of Patents.

CERTIFICATE OF CORRECTION.

Patent No. 2,066,552.  January 5, 1937.

FRANK C. BEST.

It is hereby certified that error appears in the printed specification of the above numbered patent requiring correction as follows: Page 5, first column, line 14, claim 7, before the word "greater" insert substantially; and that the said Letters Patent should be read with this correction therein that the same may conform to the record of the case in the Patent Office.

Signed and sealed this 25th day of May, A. D. 1937.

(Seal)

Henry Van Arsdale
Acting Commissioner of Patents.